(12) United States Patent
Zhou et al.

(10) Patent No.: US 10,480,139 B2
(45) Date of Patent: Nov. 19, 2019

(54) STAMPEDE PREVENTING METHOD FOR PEDESTRIAN PASSAGE IN CONFINED SPACE OF SUBWAY

(71) Applicants: China University of Mining and Technology, Jiangsu (CN); JIANGSU XINCHUANG SAFETY TECHNOLOGY RESEARCH INSTITUTE CO., Ltd., Jiangsu (CN)

(72) Inventors: Fubao Zhou, Jiangsu (CN); Chun Liu, Jiangsu (CN); Zhongyi Man, Jiangsu (CN)

(73) Assignees: China University of Mining and Technology, Jiangsu (CN); JIANGSU XINCHUANG SAFETY TECHNOLOGY RESEARCH INSTITUTE CO., LTD., Jiangsu (CN)

( * ) Notice: Subject to any disclaimer, the term of this patent is extended or adjusted under 35 U.S.C. 154(b) by 0 days.

(21) Appl. No.: 16/343,773

(22) PCT Filed: Nov. 7, 2017

(86) PCT No.: PCT/CN2017/109680
§ 371 (c)(1),
(2) Date: Apr. 21, 2019

(87) PCT Pub. No.: WO2018/086505
PCT Pub. Date: May 17, 2018

(65) Prior Publication Data
US 2019/0249382 A1    Aug. 15, 2019

(30) Foreign Application Priority Data

Nov. 8, 2016    (CN) .......................... 2016 1 0980437

(51) Int. Cl.
*E01F 13/04*    (2006.01)

(52) U.S. Cl.
CPC .................................. *E01F 13/04* (2013.01)

(58) Field of Classification Search
CPC .................................. E01F 13/04; E21F 11/00
(Continued)

(56) References Cited

U.S. PATENT DOCUMENTS

| 6,169,954 B1 | 1/2001 | McCrary |
| 7,708,493 B2 * | 5/2010 | Jung ......................... G09F 9/30 |
| | | 116/63 R |

(Continued)

FOREIGN PATENT DOCUMENTS

| CN | 104680712 | 6/2015 |
| CN | 105282523 | 1/2016 |

(Continued)

OTHER PUBLICATIONS

"International Search Report (Form PCT/ISA/210)", dated Jan. 29, 2018, with English translation thereof, pp. 1-6.

*Primary Examiner* — Gary S Hartmann
(74) *Attorney, Agent, or Firm* — JCIPRNET

(57) ABSTRACT

A stampede preventing method for a pedestrian passage in a confined space of a subway. Pedestrian flow sensors are arranged on a pedestrian passage, where the pedestrian flow sensors are connected to a control unit by means of data transmission lines, the control unit is connected to stampede preventing devices and top ends of the stampede preventing devices are connected to movable walls and handrails; the pedestrian flow sensors transmit a pedestrian number and crowdedness that are monitored in real time; the control unit analyzes signals of the pedestrian flow sensors according to a system program, and determines whether crescent buffer space areas need to be opened in the pedestrian passage; the control unit issues different expansion commands according to different degrees of crowdedness; and the stampede preventing devices control the movable walls and the hand- (Continued)

rails to start contracting to form the crescent buffer space areas.

5 Claims, 1 Drawing Sheet

(58) Field of Classification Search
USPC .................................... 404/9, 71; 340/925
See application file for complete search history.

(56) References Cited

U.S. PATENT DOCUMENTS

| | | | |
|---|---|---|---|
| 9,453,311 B2* | 9/2016 | Braniff | E01F 13/04 |
| 9,921,068 B2* | 3/2018 | Harvey | G01C 21/26 |
| 2002/0046692 A1* | 4/2002 | Pharo | G07C 11/00 |
| | | | 116/200 |

FOREIGN PATENT DOCUMENTS

| | | |
|---|---|---|
| CN | 105469539 | 4/2016 |
| CN | 105763853 | 7/2016 |
| CN | 105787853 | 7/2016 |
| CN | 105913029 | 8/2016 |
| CN | 106593519 | 4/2017 |

* cited by examiner

STAMPEDE PREVENTING METHOD FOR PEDESTRIAN PASSAGE IN CONFINED SPACE OF SUBWAY

CROSS-REFERENCE TO RELATED APPLICATION

This application is a 371 application of an international PCT application serial no. PCT/CN2017/109680, filed on Nov. 7, 2017, which claims priority to and the benefit of China Patent Application No. 201610980437.5, filed on Nov. 8, 2016. The entirety of each of the above-mentioned patent applications is hereby incorporated by reference herein and made a part of this specification.

BACKGROUND OF THE INVENTION

Technical Field

The present invention relates to a stampede preventing method for a subway, and specifically to a stampede preventing method for a pedestrian passage in a confined space of a subway, and belongs to the field of subway safety technologies.

Description of Related Art

In recent years, urban railway transportation in China has achieved significant development with large increases in indexes such as line lengths, locomotive numbers, and passenger numbers. The urban railway traffic mileage in our country exceeds 3,600 kilometers and more than 40 million people are transported by subway across the country every day during the "12th Five-year Plan" period. The railway transportation industry in China will witness the construction peak in the next five years, and it is estimated that the total urban railway traffic mileage in China will reach 6,000 kilometers by the end of the "13th Five-Year Plan" in 2020. However, a stampede accident easily occurs due to the confined and enclosed space that is shallow underground of a subway, especially inside the overcrowded escape passage during evacuation of inside pedestrians when an accident occurs. Effective methods are urgently needed to prevent stampede accidents to guarantee the safety of people's life and property.

SUMMARY OF THE INVENTION

The objective of the present invention is to provide a stampede preventing method for a pedestrian passage in a confined space of a subway, where the method can monitor the pedestrian number and pedestrian crowdedness in real time and can rapidly expand the space when it becomes crowded, so as to rapidly disperse the crowd and reduce the pedestrian crowdedness, thereby achieving the purpose of preventing stampedes.

In order to achieve the objective, the present invention provides a stampede preventing method for a pedestrian passage in a confined space of a subway, which includes the following steps:

a. arranging pedestrian flow sensors on a pedestrian passage, where the pedestrian flow sensors are connected to a control unit by means of data transmission lines, the control unit is connected to stampede preventing devices by means of data transmission lines, and top ends of the stampede preventing devices are connected to movable walls and handrails;

b. transmitting, by the pedestrian flow sensors, a pedestrian number and crowdedness that are monitored in real time on the pedestrian passage to the control unit by means of the data transmission lines during operation;

c. analyzing, by the control unit, signals of the pedestrian flow sensors according to a system program, judging the level of pedestrian crowdedness on the ground, and judging according to the level of pedestrian crowdedness whether crescent buffer space areas need to be opened in the passage;

d. if it is determined, according to the data monitored by the pedestrian flow sensors, that it is crowded and a stampede accident may possibly occur, then issuing, by the control unit, different expansion commands according to different degrees of crowdedness; and e. after receiving the commands of the control unit, controlling, by the stampede preventing devices, the movable walls and the handrails to start contracting, so that two originally parallel walls are recessed toward both sides to form the crescent buffer space areas, and then the maximum bearable pedestrian flow of the passage is instantaneously increased and stampede accidents are prevented.

As a further improvement to the present invention, the pedestrian crowdedness is capable of being divided into: three levels including Overcrowded, Crowded, and Uncrowded.

As a further improvement to the present invention, the Overcrowded means that more than 5 people stand in one square meter, the Crowded means that 3 to 5 people stand in one square meter, and the Uncrowded means that fewer than 2 people stand in one square meter.

As a further improvement to the present invention, the stampede preventing device includes a hydraulic cylinder, a supporting wall, and a retractable curtain, where a cylinder tube of the hydraulic cylinder is fixed to a wall of the crescent buffer space area, and a piston rod end of the hydraulic cylinder is fixed to the movable wall.

As a further improvement to the present invention, the movable walls are separate cuboids that are connected by means of the retractable curtains to form a straight line shape or a circular arc shape.

As compared with the prior art, the present invention can rapidly open up a buffer space for pedestrian evacuation in an emergency where a stampede is about to occur; the present invention adopts intelligent control, and in daily operation, in case of crowding or a stampede accident, the system responds quickly to expand the passage space and disperse the crowd, which helps to prevent a stampede accident and also facilitates entry of outside rescuers into the space for rescue and evacuation of inside pedestrians to the outside; in the present invention, the crescent buffer space areas are excavated on both sides of the pedestrian passage in advance, the movable wall and the retractable curtain are connected by means of hinges, under normal circumstances, the retractable curtain is retracted in the wall, the control unit is placed in a control room, the pedestrian flow sensors are disposed on the pedestrian passage, and the stampede preventing devices are disposed on left and right sides of the pedestrian passage, and in case of crowding, the space is immediately expanded, so that the crowdedness is reduced and stampede accidents are prevented.

BRIEF DESCRIPTION OF THE DRAWINGS

FIG. 2 is a block diagram illustrating a control structure of the present invention.

Figure 1:
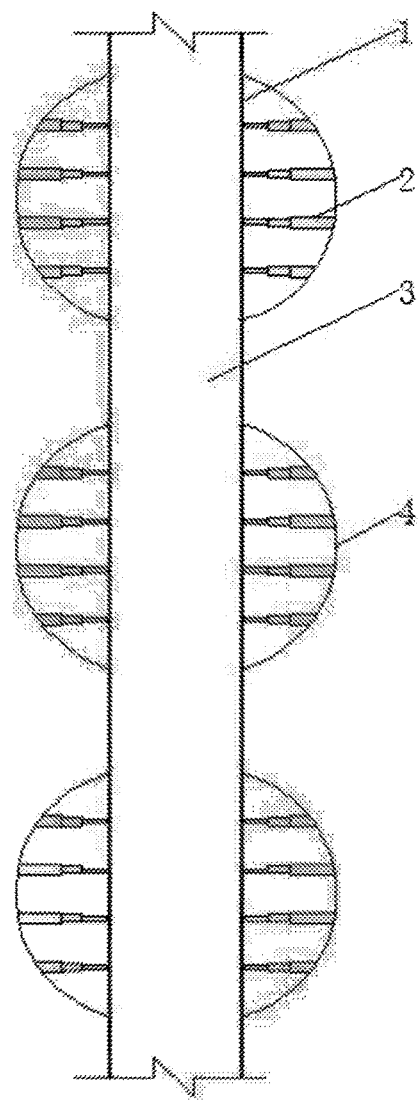
FIG. 1 is a schematic structural view of the present invention

In the drawings: 1. movable wall, 2. stampede preventing device, 3. pedestrian passage, 4. crescent buffer space area.

DESCRIPTION OF EMBODIMENTS

The present invention is further described below with reference to the drawings.

Figure 2:
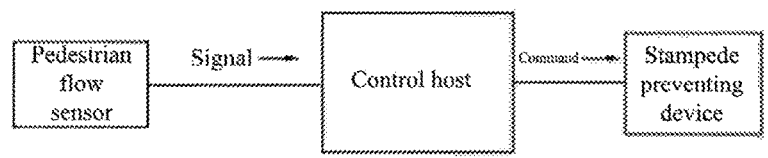
FIG. 2 is a schematic view of a projection device according to another embodiment of the disclosure.

As shown in FIG. 1 and FIG. 2, a stampede preventing method for a pedestrian passage in a confined space of a subway includes the following steps:

a. arranging pedestrian flow sensors on a pedestrian passage 3, where the pedestrian flow sensors are connected to a control unit by means of data transmission lines, the control unit is connected to stampede preventing devices 2 by means of data transmission lines, and top ends of the stampede preventing devices 2 are connected to movable walls 1 and handrails;

b. transmitting, by the pedestrian flow sensors, a pedestrian number and crowdedness that are monitored in real time on the pedestrian passage 3 to the control unit by means of the data transmission lines during operation;

c. analyzing, by the control unit, signals of the pedestrian flow sensors according to a system program, judging the level of pedestrian crowdedness on the ground, and judging according to the level of pedestrian crowdedness whether crescent buffer space areas 4 need to be opened in the passage;

d. if it is determined, according to the data monitored by the pedestrian flow sensors, that it is crowded and a stampede accident may possibly occur, then issuing, by the control unit, different expansion commands according to different degrees of crowdedness;

e. after receiving the commands of the control unit, controlling, by the stampede preventing devices 2, the movable walls 1 and the handrails to start contracting, so that two originally parallel walls are recessed toward both sides to form the crescent buffer space areas 4, and then the maximum bearable pedestrian flow of the passage is instantaneously increased and stampede accidents are prevented.

Further, the pedestrian crowdedness is capable of being divided into: three levels including Overcrowded, Crowded, and Uncrowded.

Further, the Overcrowded means that more than 5 people stand in one square meter, the Crowded means that 3 to 5 people stand in one square meter, and the Uncrowded means that fewer than 2 people stand in one square meter.

Further, the stampede preventing device 2 includes a hydraulic cylinder, a supporting wall, and a retractable curtain, where a cylinder tube of the hydraulic cylinder is fixed to a wall of the crescent buffer space area 4, and a piston rod end of the hydraulic cylinder 4 is fixed to the movable wall 1.

Further, the movable walls 1 are separate cuboids that are connected by means of the retractable curtains to form a straight line shape or a circular arc shape.

Embodiment 1 a. Pedestrian flow sensors are arranged on a pedestrian passage 3, where the pedestrian flow sensors are connected to a control unit by means of data transmission lines, the control unit is connected to stampede preventing devices 2 by means of data transmission lines, and top ends of the stampede preventing devices 2 are connected to movable walls 1 and handrails;

b. the pedestrian flow sensors monitor in real time a pedestrian number of 100 on the pedestrian passage 3 during operation, and the pedestrian flow sensors transmit data signals to the control unit by means of the data transmission lines;

c. the control unit calculates the signals of the pedestrian flow sensors according to a system program to obtain a pedestrian density of the pedestrian passage being 5 people per square meter, judges that the level of crowdedness of the pedestrian passage is Overcrowded, and determines that crescent buffer space areas 4 need to be expanded in the pedestrian passage;

d. the control unit analyzes the data monitored by the pedestrian flow sensors to determine that it is crowded and a stampede accident may possibly occur; the control unit issues to the stampede preventing devices 2 a command of expanding the crescent buffer space areas 4 according to the degree of crowdedness;

e. after receiving the command of the control unit, the stampede preventing devices 2 control hydraulic cylinders to contract by 2 m, 3 m, 3 m, and 2 m, respectively, from top to bottom, so that two originally parallel movable walls 1 are recessed toward both sides to form the crescent buffer space areas 4, and then the maximum bearable pedestrian flow of the passage is instantaneously increased and stampede accidents are prevented.

Further, the pedestrian crowdedness is capable of being divided into: three levels including Overcrowded, Crowded, and Uncrowded.

Further, the criterion for level division of the pedestrian crowdedness is as follows: the Overcrowded means that more than 5 people stand in one square meter, the Crowded means that 3 to 5 people stand in one square meter, and the Uncrowded means that fewer than 2 people stand in one square meter.

Further, the stampede preventing device 2 includes a hydraulic cylinder, a supporting wall, and a retractable curtain, where a bottom end of the hydraulic cylinder is fixed to a wall of the crescent buffer space area 4, and the other end of the hydraulic cylinder is fixed to the movable wall 1, and the movable walls 1 are separate cuboids that are connected by means of the retractable curtains to form a straight line shape or a circular arc shape.

What is claimed is:

1. A stampede preventing method for a pedestrian passage in a confined space of a subway, comprising the following steps:

arranging pedestrian flow sensors on a pedestrian passage, wherein the pedestrian flow sensors are connected to a control unit by means of data transmission lines, the control unit is connected to stampede preventing devices by means of data transmission lines, and top ends of the stampede preventing devices are connected to movable walls and handrails;

transmitting, by the pedestrian flow sensors, a pedestrian number and crowdedness that are monitored in real time on the pedestrian passage to the control unit by means of the data transmission lines during operation;

analyzing, by the control unit, signals of the pedestrian flow sensors according to a system program, judging the level of pedestrian crowdedness on the ground, and judging, according to the level of pedestrian crowdedness, whether crescent buffer space areas need to be opened in the passage;

determining, according to the data monitored by the pedestrian flow sensors, when it is crowded and a stampede accident may possibly occur, issuing, by the control unit, different expansion commands according to different degrees of crowdedness; and controlling, after receiving the commands of the control unit, by the stampede preventing devices, the movable walls and the handrails to start contracting, so that two originally parallel walls are recessed toward both sides to form the crescent buffer space areas, and then the maximum bearable pedestrian flow of the passage is instantaneously increased and stampede accidents are prevented.

2. The stampede preventing method for a pedestrian passage in a confined space of a subway according to claim 1, wherein the pedestrian crowdedness may be divided into: three levels comprising Overcrowded, Crowded, and Uncrowded.

3. The stampede preventing method for a pedestrian passage in a confined space of a subway according to claim 2, wherein the Overcrowded means that more than 5 people stand in one square meter, the Crowded means that 3 to 5 people stand in one square meter, and the Uncrowded means that fewer than 2 people stand in one square meter.

4. The stampede preventing method for a pedestrian passage in a confined space of a subway according to claim 1, wherein the stampede preventing device comprises a hydraulic cylinder, a supporting wall, and a retractable curtain, a cylinder tube of the hydraulic cylinder is fixed to a wall of the crescent buffer space area, and a piston rod end of the hydraulic cylinder is fixed to the movable wall.

5. The stampede preventing method for a pedestrian passage in a confined space of a subway according to claim 4, wherein the movable walls are separate cuboids that are connected by means of the retractable curtains to form a straight line shape or a circular arc shape.

* * * * *